W. McARTHUR.
Composition for Fire-Kindler.
No. 196,918.        Patented Nov. 6, 1877.
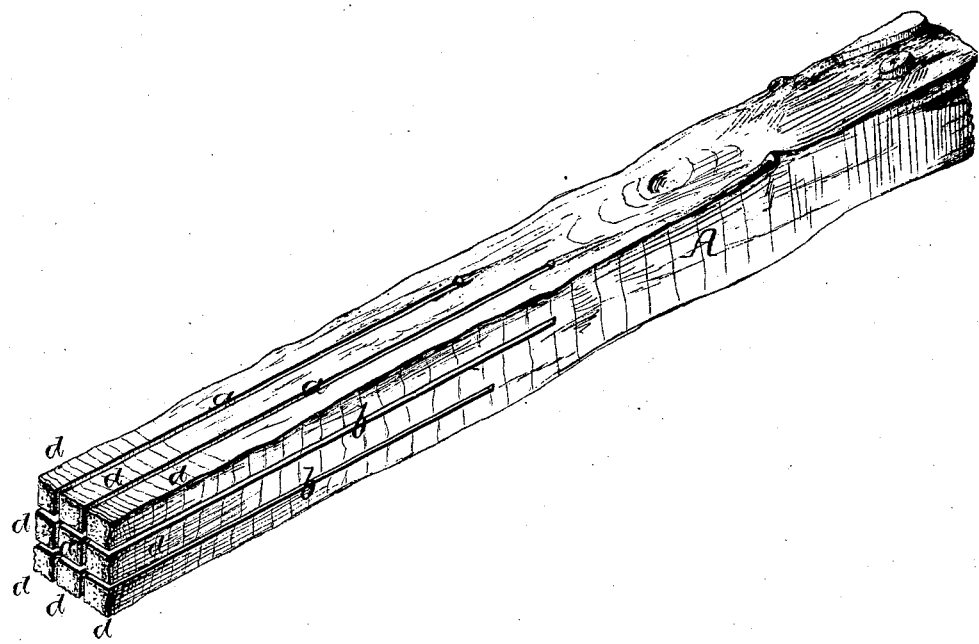
Witnesses
Richard L. Gardiner
Harry Smith
Inventor
William McArthur
by his Attorneys
Howson and Son

UNITED STATES PATENT OFFICE.

WILLIAM McARTHUR, OF PHILADELPHIA, PENNSYLVANIA.

IMPROVEMENT IN COMPOSITIONS FOR FIRE-KINDLERS.

Specification forming part of Letters Patent No. 196,918, dated November 6, 1877; application filed September 3, 1877.

*To all whom it may concern:*

Be it known that I, WILLIAM MCARTHUR, of Philadelphia, Pennsylvania, have invented a new and useful Improvement in Compositions for Fire-Kindlers, of which the following is a specification:

The object of my invention is to produce a cheap, inflammable, and adhesive composition for fire-kindlers, an object which I attain in the manner which I will now proceed to describe.

My improved composition, with which the fire-kindler is to be saturated, is composed of benzine, balsam of fir, and resin, in the proportion of a gallon of benzine to about two pounds of each of the other ingredients.

In the accompanying drawing I have illustrated the particular form of fire-kindler which I prefer to impregnate with the improved composition.

This kindler consists of a strip, A, of wood, preferably pine, of about the size of an ordinary stick of kindling-wood, the block being slotted throughout a portion of its length, so as to form fingers $d$, separated by narrow spaces, as shown in the drawing.

The slotted end of the strip is dipped into the inflammable material or composition, which will surround and impregnate the fingers $d$, the gummy character of the composition causing it to adhere to the stick, and preventing the resin from becoming caked, and from peeling off.

I claim as my invention—

The within-described composition for fire-kindlers, the said composition consisting of benzine, balsam of fir, and resin, combined substantially in the manner and proportions set forth.

In testimony whereof I have signed my name to this specification in the presence of two subscribing witnesses.

WM. McARTHUR.

Witnesses:
HARRY A. CRAWFORD,
HARRY SMITH.